United States Patent [19]

Schaupp

[11] Patent Number: 4,724,074
[45] Date of Patent: Feb. 9, 1988

[54] SELF-VENTING DRAIN ASSEMBLY

[75] Inventor: Richard E. Schaupp, Modesto, Calif.

[73] Assignee: Parker Hannifin Corporation, Cleveland, Ohio

[21] Appl. No.: 784,300

[22] Filed: Oct. 7, 1985

[51] Int. Cl.$^4$ ............................................. B01D 35/00
[52] U.S. Cl. ..................................... 210/163; 210/472
[58] Field of Search ............... 210/163, 164, 165, 166, 210/116, 117, 120, 248, 312, 313, 472; 141/364, 198, 292; 249/141; 137/558, 588

[56] References Cited

U.S. PATENT DOCUMENTS

| | | |
|---|---|---|
| 732,122 | 6/1903 | Schneider . |
| 1,938,988 | 12/1933 | Wallace . |
| 2,036,990 | 4/1936 | De Faveri . |
| 3,207,190 | 9/1965 | Sibereis et al. ................ 141/198 |
| 3,211,194 | 10/1965 | Projahn . |
| 3,540,402 | 11/1970 | Kocher . |
| 3,606,096 | 9/1971 | Campbell . |
| 3,727,638 | 4/1973 | Zaremba, Jr. et al. . |
| 4,314,689 | 2/1982 | Wilson . |
| 4,440,193 | 4/1984 | Matheson . |
| 4,502,956 | 3/1985 | Wilson et al. . |

Primary Examiner—Frank Sever
Attorney, Agent, or Firm—Joseph B. Balazs

[57] ABSTRACT

A drain assembly uses a valve body with a drain passage and a vent passage in order to provide self-venting drainage of a collection bowl mounted to a filter unit. The valve body cooperates with a seal such that the drain passage is opened before the vent passage, thereby insuring proper operation of the passages. Additionally, the valve body draws air into a cavity within the seal, thereby inherently clearing an upper vent port of fluid prior to opening of a vent port disposed at the upper end of the vent passage.

7 Claims, 4 Drawing Figures

SELF-VENTING DRAIN ASSEMBLY

BACKGROUND OF THE INVENTION

This invention relates to a drain assembly. More specifically, this invention relates to a drain assembly which is self-venting.

The draining of liquid or other material from a closed chamber is limited by the size of the drain port or ports through which drainage may proceed. Additionally, the drainage may be slowed or limited by the partial vacuum occurring upon drainage of part of the liquid. That is, as liquid proceeds out of a chamber, it will create a partial vacuum which may slow or possibly stop the drainage.

Numerous drain assemblies have been developed in an attempt to avoid the problem of negative pressure which occurs upon draining a closed chamber. Such drain assemblies commonly use a drain passage and a separate vent passage, the vent passage serving to allow air into the closed chamber to replace the liquid or other material removed from the chamber.

The following U.S. patents show various drain assemblies:

| U.S. Pat. No. | Inventor | Issuance Date |
|---|---|---|
| 3,207,190 | Silbereis, et al | September 21, 1965 |
| 3,606,096 | Campbell | September 20, 1971 |
| 3,540,402 | Kocher | November 17, 1970 |
| 3,727,638 | Zaremba, Jr. et al | April 17, 1973 |
| 4,314,689 | Wilson | February 9, 1982 |
| 4,440,193 | Matheson | April 3, 1984 |
| 4,502,956 | Wilson, et al | March 5, 1985 |

The Silbereis et al patent shows a liquid dispensing arrangement for filling batteries and including separate liquid and air passages within a common element which are spring biased toward a closed position.

The Campbell patent shows a liquid dispensing device having a liquid passage and a separate air passage within a common valve member. A plug is mounted at the top of the valve member and moves with movement of the valve member. The valve member is normally biased into a closed position by a spring. The valve member is opened by pushing it upwardly against the bias of the spring.

The Kocher patent shows a device for dispensing liquids including a stem having a liquid passage and an air passage. A spring arrangement insures that the liquid passage is opened prior to the opening of the air or vent passage.

The Zaremba, Jr. et al patent shows a drain plug assembly having an upper tubular member tapered inwardly with a valve member threadably mounted therein. The valve member includes a duct extending lengthwise therein and having ports at its upper and lower ends. The valve member is moved downwardly to open the drain.

The Wilson U.S. Pat. No. '689 shows a drain valve assembly including an elongate plug having an axial passage therein. The plug may be threaded up to a closed position against an upper seal and downwardly to allow drainage of contaminants through side holes into the axial passage.

The Matheson patent shows a valve assembly having a valve piece with a central axial drain passage. The vale piece threads to a body member including a vent passage which may be sealed by the valve piece upon it being moved downwardly.

The Wilson U.S. Pat. No. '956 patent shows drainage assemblies with seals above valve bodies having axial drain passages.

The following patents are representative of various other closure structures:

| U.S. Pat. No. | Inventor | Issue Date |
|---|---|---|
| 732,122 | Schneider | June 30, 1903 |
| 1,938,988 | Wallace | December 12, 1933 |
| 2,036,990 | De Faveri | April 7, 1936 |
| 3,211,194 | Projahn | October 12, 1965 |

The Schneider patent discloses a barrel tap having a centrally located gas bore adjacent to a separate fluid bore.

The Wallace patent shows an automatic filling plug having central and peripheral passages which freely communicate with each other. The arrangement provides for venting upon supplying liquid into battery cells.

The De Faveri patent shows a bottle closure having a cap with a peripheral downwardly extending portion radially outside of external threads on the cap which cooperate with internal threads upon a tube. The tube will be disposed radially between the external threads and the downwardly projecting peripheral portion of the cap.

The Projahn patent shows a filling valve including a central passage within a valve member, the valve member being spring biased toward a closed position.

Although prior drain assemblies have been generally useful, they have had numerous disadvantages.

Those prior drain assemblies which are self-venting have often been complex and costly to construct. For example, some such designs require one or more springs and/or a relatively complex arrangement of seals. Additionally, some prior drain assemblies have the disadvantage of allowing some drainage flow through their vent passages. Indeed, movement of the valve piece may actually draw drainage liquid into the vent passage intially for some designs. Further, some designs use threads which are exposed to drainage such that the threads may jam or bind together.

OBJECTS AND SUMMARY OF THE INVENTION

Accordingly, it is a primary object of the present invention to provide a new and improved drain assembly.

A more specific object of the present invention is to provide a self-venting drain assembly which is simple and relatively inexpensive in construction.

Another object of the present invention is to provide a drain assembly which minimizes drainage through the vent passage.

A further object of the present invention is to provide a drain assembly which is unlikely to have its valve stick or jam in position.

Yet another object of the present invention is to provide a drain assembly which, in relatively simple fashion, provides for opening of a vent passage only after a drain passage has been opened.

A still further object of the present invention is to provide a valve assembly wherein movement of a valve towards its open position serves to clear a vent port of fluid before the vent port is opened.

The above and other objects of the present invention which will become more apparent as the description proceeds are realized by a self-venting drain assembly comprising: an upper body portion extending up into a collection chamber, the upper body portion having an outer side wall with a main interior surface which is symmetric about a vertical central axis and defines a main valve chamber, the main valve chamber also bound by a ceiling, the side wall having at least one side hole to provide communication therethrough; an upper valve chamber extending above the ceiling and up from the main valve chamber and bound by an upper interior side surface which is symmetric about the central axis; and a valve body having a peripheral wall extending to an upper edge, an upper vent wall extending above the upper edge and having an outer surface which is symmetric about the central axis, a drain passage extending in the valve body and having an upper drain port adjacent the upper edge and a lower drain port, a vent passage extending in the valve body and including an upper vent passage portion within the upper vent wall, the vent passage extending between an upper vent port at the upper vent wall and a lower vent port. The valve body is disposable in: a closed position preventing drainage flow from the collection chamber, the closed position having the peripheral wall directly facing the main interior surface and blocking the side hole to prevent drainage from reaching the upper drain port, the closed position also have the upper vent wall disposed within the upper valve chamber to close the upper vent port; and an open position with the valve body moved downwardly from its closed position to allow venting and drainage of the collection chamber, the open position having the upper edge below at least part of the side hole to allow drainage to pass from the side hole into the upper drain port and down the drain passage to flow out the lower drain port, and the open position allowing venting air to freely pass up through the vent passage. The valve body is operable in moving from its closed position to its open position such that the upper edge is below the side hole to allow communication between the collection chamber and the drain passage before the upper vent wall is moved sufficiently downwardly to allow communication between the collection chamber and the vent passage. The valve body further functions to draw air into the upper valve chamber upon the valve body being moved downwardly such that the air prevents drainage through the vent passage. The drain assembly further comprises an annular lower body portion below the upper body portion and having external threads on a radially outer surface thereof. The valve body includes an upwardly projecting annular connecting portion having internal threads mated to the external threads. The valve body is moved between its closed and open positions by rotating the valve body. A protective shroud is fixed relative to the lower body portion and extends around the connecting portion. An upper seal is disposed above the main valve chamber, the upper valve chamber being disposed in the upper seal. The upper seal seals both the upper drain port and the upper vent port when the valve body is in its closed position. The peripheral wall has an annular wall ledge below the upper edge and facing an annular stop ledge below the upper body portion. An annular seal is disposed between the wall ledge and the stop ledge. Both of the upper vent wall and the upper vent port are symmetric about the central axis.

The present invention may alternately be described as a self-venting drain assembly comprising: an upper body portion extending up into a collection chamber, the upper body portion having an outer side wall defining a main wall chamber, the side wall having at least one side hole to provide communication therethrough; an upper seal fixed relative to the side wall and disposed at the top of the main chamber, the upper seal having an upper valve chamber disposed therein and bounded by an upper interior side surface; and a valve body having a peripheral wall extending to an upper edge, an upper vent wall extending above the upper edge and having an outer surface, a drain passage extending in the valve body and having an upper drain port adjacent the upper edge and a lower drain port, a vent passage extending in the valve body and including an upper vent passage portion within the upper vent wall, the vent passage extending between an upper vent port at the upper vent wall and a lower vent port. The valve body is disposable in a closed position preventing drainage flow from the collection chamber, the closed position having the peripheral wall blocking communication between the side hole and the upper drain port, the closed position further having the upper vent wall disposed within the upper valve chamber and the upper seal sealing both the upper drain port and the upper vent port; and an open position with the valve body moved downwardly from its closed position to allow venting and drainage of the collection chamber such that neither of the upper vent port and the upper drain port is sealed by the upper seal. The valve body functions, upon movement from its closed position to its open position, to allow communication between the drain passage and the collection chamber before allowing communication between the vent passage and the collection chamber. The valve body functions further to draw air into the upper valve chamber upon the valve body being moved downwardly such that the air prevents drainage through the vent passage. The upper vent wall and the upper vent drain are both symmetric about a vertical central axis. The drain assembly is disposed on a floor of a contaminate collection bowl removably attachable to a filter unit.

The present invention may alternately be described as a self-venting drain assembly comprising: an upper body portion extending up into a collection chamber, the upper body portion having an outer side wall and a valve chamber, the side wall having at least one side hole to provide communication therethrough; a valve body having a drain passage extending therethrough from an upper drain port to a lower drain port and having a vent passage extending therethrough from an upper vent port to a lower vent port. The valve body is disposable in: a closed position preventing drainage flow from the collection chamber and with the valve in the valve chamber; and an open position with the valve moved downwardly from its closed position to allow venting and drainage of the collection chamber. The valve body functions, upon movement from its closed position to its open position to allow communication between the drain passage and the collection chamber before allowing communication between the vent passage and the collection chamber. The valve body further functions to draw air into the valve chamber upon the valve body being moved downwardly such that the air prevents drainage through the vent passage. The vent passage includes an upper vent passage portion. Both the upper vent passage portion and the upper vent port are symmetric about a vertical axis, which axis is central to the valve body. The upper vent passage portion is within an upper vent wall. The upper vent passage portion extends higher than the drain passage. The valve chamber includes a main portion bound by a ceiling and an upwardly extending portion above the ceiling and in which the upper vent wall extends when the valve body is in its closed position. The upwardly extending portion is centrally located above the main portion.

BRIEF DESCRIPTION OF THE DRAWINGS

The above and other features of the present invention will become more apparent when the following detailed description is considered in conjunction with the accompanying drawings wherein like characters represent like parts throughout the several views and in which.

DETAILED DESCRIPTION

Figure 1:
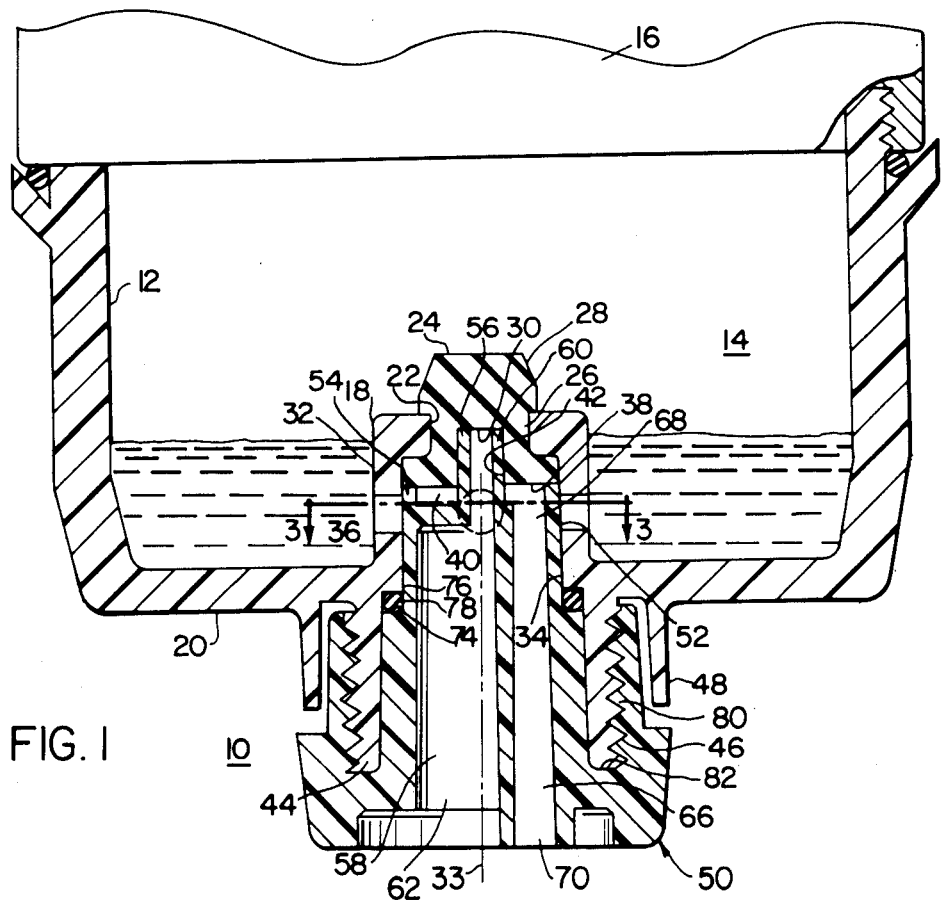
FIG. 1 shows a cross section view of the drain assembly of the present invention when disposed in a closed position.

With reference to FIG. 1, the drain assembly 10 of the present invention will be discussed in detail. FIG. 1 shows a cross section view of the drain assembly 10 as mounted upon the floor of a contaminate collection bowl 12 which encloses a collection chamber 14 and is threadably attached to a filter unit 16.

The drain assembly 10 includes an upper body portion 18 extending up from the bottom 20 of the bowl 12. As shown, the upper body portion 18 is generally cylindrical with a circular top hole 22 disposed therein. Locked within the hole 22 is an upper seal 24, made of rubber or other commonly used resilient sealing material. As shown, the upper seal 24 has an annular groove 26 allowing it to be resiliently locked into the hole 22. The seal 24 may be pushed into place from below the hole 22 by use of the tapered portion 28 at the top of seal 24. The seal 24 further includes an upwardly projecting cylindrical cavity 30 which is centered upon a vertical central axis 33.

The upper body portion 18 includes a cylindrical outer side wall 32 having a main interior surface 34. The side wall 32 includes a plurality of holes 36 (preferably 4 holes spaced 90 degrees apart) which allow communication through the side wall 32. The main interior surface 34 defines a main valve chamber bound at its top by a ceiling 38 formed by the underside of seal 24. This main valve chamber 40 may be considered as a subpart of an overall valve chamber also including the cavity 30 which constitutes an upper valve chamber. The upper valve chamber 30 is bound by upper interior side surfaces 42, which like the main interior surfaces or surface, 34 are cylindrical and symmetric with respect to the central axis 33.

Extending downwardly from the bottom 20 is an annular lower body portion 44 having external threads 46 extending thereon. Radially outside of the lower body portion 44 is an annular protecting shroud 48, which like the upper body portion 18 and the lower body portion 44, is integral with the collection bowl 12 for the illustrated embodiment.

A valve body 50 is centrally disposed along vertical central axis 32. The valve body 50 is integral and includes a peripheral wall 52 extending to an upper edge 54. Additionally, the valve body 50 includes an upper vent wall 56 which extends above the upper edge 54.

Figure 3:
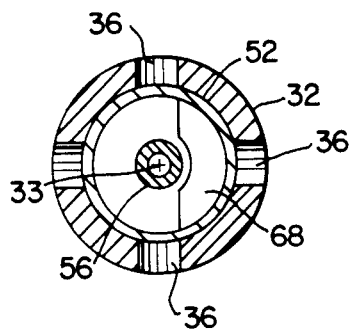
FIG. 3 shows a cross section view taken along lines 3—3 of FIG. 1.

Continuing to view FIG. 1, but also considering the cross section view of the FIG. 3 taken along lines 3—3 of FIG. 1, it will be appreciated that the upper vent wall 56 is cylindrical, hollow and centered about the central axis 32.

Figure 4:
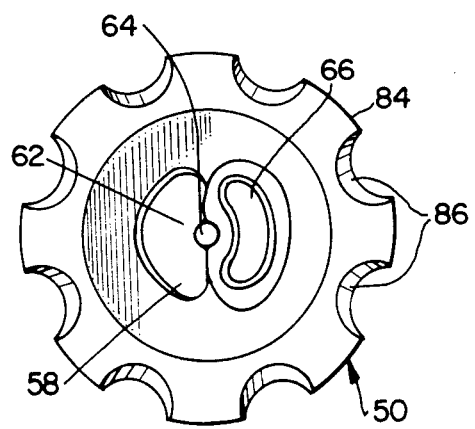
FIG. 4 shows a bottom view of the drain assembly of the present invention.

With reference also now to FIG. 4, the valve body 50 includes a vent passage 58 extending lengthwise therein between an upper vent port 60 disposed at the top of upper vent wall 56 and a lower vent port 62. The vent passage 58 includes an upper vent passage portion 64 (labeled in FIG. 4 only) within the upper vent wall 56.

Independent of the vent passage 58 is a drain passage 66 which extends lengthwise in the valve body 50 between an upper drain port 68 (FIG. 3) and a lower drain port 70. As shown, the vent passage 58 and the drain passage 66 are completely separated by separation wall 72.

As shown in FIG. 1, the upper portion of the valve body 50 including the upper vent port 60 and the upper drain port 68 extends to within the bowl 12 and above the bowl bottom 20. The peripheral wall 52 of valve body 50 extends down and out of the bowl bottom 20 as shown. Additionally, the peripheral wall includes an annular wall ledge 74 separated from an annular stop ledge 76 by an O ring 78. The O ring may be adhered to the wall ledge 74 to move with the valve body 50. Alternately, the O ring 78 could be adhered to the stop ledge 76 or not bonded to any surface.

The external portion of the valve body 50 (that portion outside of the collection bowl 12) includes an upwardly projecting annular connecting portion 80 having internal threads 82 which mate to the external threads 46 of the lower body portion 44.

Figure 2:
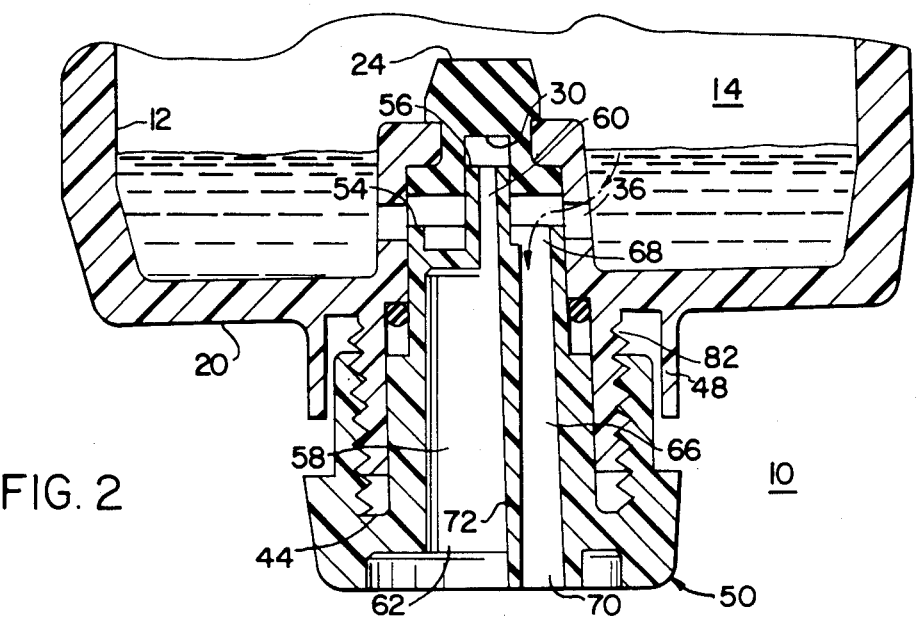
FIG. 2 shows a cross section view of the drain assembly of the present invention in another position.

With reference now to FIG. 1 and FIG. 2, showing the valve body 50 moved from its closed position of FIG. 1, the operation of the present invention will be discussed.

In the position of FIG. 1 the valve body 50 is in its upper-most and closed position with the upper seal 24 sealing off communication between the upper vent port 60 and the collection chamber 14. Further, the upper seal 24 seals at the upper edge 54 such that the upper drain port 68 is sealed. Also, the peripheral wall 52 of valve body 50 is directly facing the main interior surface 34 and blocking the side holes 36 to prevent drainage from reaching the upper drain port 68. The seal 24 contacting the upper edge 54, of course, prevents leakage around that interface. The upper vent wall 56 is disposed within the upper valve chamber comprised of the cavity 30 within seal 24. (Alternately, this upper valve chamber constituted by cavity 30 may be considered as an upper portion of an overall valve chamber comprising both cavity 30 and the main valve chamber 40.) Thus, both the drain passage 66 and the vent passage 58 will be sealed against communication with the collection chamber 14.

In order to open the drain assembly 10, the valve body 50 may be moved downwardly by manually gripping recesses 86 of flange 84 (refer momentarily to FIG. 4). The rotation of the valve body 50, thereby partially unscrewing the connection between the threads, results in the upper edge 54 moving to below the top of the holes 36 such that the drain passage 66 is now free to communicate with the collection chamber 14 by way of holes 36 and the upper drain port 68. As shown in FIG. 2, the upper seal 24 maintains the isolation between the vent passage 58 and its upper vent port 60 event after communication is allowed between the drain passage 66 and the collection chamber 14. Contaminant liquid may then proceed at least partially down the drain passage 66. Depending upon the type of liquid which is being drained and other factors, the liquid drainage may be halted by the partial vacuum formed by partial exiting by some liquid, or, alternately, may flow out in irregular fashion caused by the partial vacuum. At any rate, the drainage liquid or other material will at least be located at a lower level than the upper vent port 60 by virtue of the upper drain port 68 being located adjacent to the upper edge 54 and below the upper vent port 60.

An important feature of the present invention will be best understood by reference to FIG. 2 wherein the lowering of the valve body 50 to the illustrated intermediate position will draw air into the cavity 30 within seal 24. That is, as the upper vent wall 56 moves downwardly the cavity 30 is freely communicating with the ambient air such that air will move into the cavity 30 to replace that portion of the upper vent wall 56 removed from the cavity 30. By virtue of this feature of drawing the air into the cavity 30, the present invention inherently clears the zone around vent port 60 of drainage fluid before it is opened.

Upon moving the valve body 50 further downward from the position of FIG. 2 sufficiently far that the upper vent port 60 is clear of the seal 24, the drainage assembly 10 will be fully open with drainage proceeding rapidly out the drain passage 66 and venting air freely replacing the drained liquid, thereby avoiding any partial vacuum which might otherwise form. By virtue of the timed opening (i.e., upper drain port 68 communicates with collection chamber 14 before upper vent port 60 communicates with collection chamber 14) and the feature whereby air is drawn into the cavity 30, virtually no drainage will occur through the vent passage 58. (It should be noted that the feature of drawing air around the upper vent port is highly advantageous over those prior art drainage assemblies which actually draw liquid adjacent the upper vent port during their initial movement, thereby resulting in at least a little drainage through the vent passage.)

The arrangement of the threads 46 and 82 is advantageous in that they are quite removed from the drainage liquid. Even in the event that a small amount of drainage liquid got past the O ring 78, it would be quite unlikely to move up on the outside of portion 44 so as to clog or otherwise cause sticking of the connection between the threads 46 and 82. The downwardly projecting protective shroud 48 extends around the threads 82 and protects them from dirt when the valve body 50 is moved downwardly from its closed position of FIG. 1 to its intermediate position of FIG. 2 and further downward to its fully open position whereby the upper vent port 60 is clear of the seal 24.

Although not shown in the drawing, the protective shroud 48 may include a small inwardly projecting rim at its bottom and the connecting portion 80 may include a small outwardly projecting annular rim surrounding its upper end such that the valve body 50 is "captured" against its complete removal from the lower body portion 44. Any of numerous other stop arrangements would be used, if desired, to prevent complete removal of the valve body 50.

Although specific structures have been disclosed herein, it is to be understood that these are for illustrative purposes only. Various modifications and adaptations will be readily apparent to those of ordinary skill in the art. For example, the present drain assembly 10 could be used for draining a dual collection chamber bowl such as shown in FIG. 4 of the above-discussed Wilson U.S. Pat. No. 4,502,956 by having the side holes 36 communicate with two collection chambers. Accordingly, the scope of the present invention should be determined by reference to the claims appended hereto.

What is claimed is:

1. A self-venting drain assembly comprising: means for clearing a vent port of fluid only before the vent port is opened by movement of a valve toward its open position, including an upper body portion extending up into a collection chamber, said upper body portion having a side wall defining a main valve chamber, said side wall having at least one side hole to provide communication therethrough, an elastomeric upper seal fixed relative to said side wall and disposed at the top of said main chamber, said upper seal having a cavity therein, a valve body having a peripheral wall extending to an upper edge engageable with said seal, an upper vent wall extending above said upper edge and receivable in said seal cavity, a drain passage extending in said valve body and having an upper drain port adjacent said upper edge and a lower drain port, a vent passage extending in said valve body and having an upper vent passage portion within said upper vent wall, said vent passage extending between an upper vent port and a lower vent port, said valve body being movable in said upper body portion between upper, intermediate and lower positions wherein in said upper position said upper vent wall and said upper edge of said valve body are in sealing engagement with said seal to close said upper vent port and said upper drain port, wherein in said intermediate position, said upper vent wall is in sealing engagement with said seal, being partly withdrawn from said seal cavity for clearing said upper vent port, and said upper edge of said valve body is spaced from said seal to open said upper drain port, wherein in said lower position said upper vent wall and said upper edge of said valve body are spaced from said seal to open both said upper vent port and said upper drain port, and means for moving said valve body between the upper, intermediate and lower positions.

2. The drain assembly of claim 1 wherein said seal cavity is a closed end cylindrical recess and said upper vent wall is tubular and slidably received in sealing engagement in said recess.

3. The drain assembly of claim 1 wherein both said upper vent wall and said upper edge of said body are symmetric about a vertical central axis.

4. The drain assembly of claim 1 wherein said means for moving said valve body comprises mating threads on said valve body and said collection chamber whereby said valve body may be rotated between upper, intermediate and lower positions.

5. The drain assembly of claim 4 wherein said collection chamber comprises an annular lower body portion having said threads thereon and said valve body comprises an upwardly projecting annular connecting portion having said threads thereon.

6. The drain assembly set forth in claim 5 wherein said threads on said collection chamber are external threads and said threads on said valve body are internal threads and further including a shroud on said collection chamber external of both said threads for preventing contamination thereof.

7. The drain assembly set forth in claim 1 wherein said drain assembly is disposed on a floor of a contaminant collection bowl removably attachable to a filter unit.

* * * * *